US009220250B1

(12) United States Patent
Davis, Sr.

(10) Patent No.: US 9,220,250 B1
(45) Date of Patent: Dec. 29, 2015

(54) SOLAR POWERED AERATED BAIT BOX

(71) Applicant: Michael W. Davis, Sr., Lecompte, LA (US)

(72) Inventor: Michael W. Davis, Sr., Lecompte, LA (US)

( * ) Notice: Subject to any disclaimer, the term of this patent is extended or adjusted under 35 U.S.C. 154(b) by 309 days.

(21) Appl. No.: 13/917,777

(22) Filed: Jun. 14, 2013

(51) Int. Cl.
*A01K 97/04* (2006.01)
*A01K 97/05* (2006.01)

(52) U.S. Cl.
CPC ................................ *A01K 97/05* (2013.01)

(58) Field of Classification Search
USPC .................................... 43/57, 56, 55
See application file for complete search history.

(56) References Cited

U.S. PATENT DOCUMENTS

| 4,181,844 | A | | 1/1980 | Moretto | |
|---|---|---|---|---|---|
| 4,615,137 | A | * | 10/1986 | Radmanovich | 43/57 |
| 4,896,452 | A | * | 1/1990 | Smith et al. | 43/57 |
| 4,936,043 | A | * | 6/1990 | Steele | 43/57 |
| 5,305,544 | A | * | 4/1994 | Testa, Jr. | 43/54.1 |
| 5,822,916 | A | * | 10/1998 | Power | 43/57 |
| 6,442,888 | B1 | * | 9/2002 | Morrow | 43/57 |
| 7,389,608 | B1 | * | 6/2008 | MacKay | 43/57 |

* cited by examiner

*Primary Examiner* — Christopher P Ellis
(74) *Attorney, Agent, or Firm* — Crossley Patent Law

(57) ABSTRACT

A solar powered aerated bait box including an insulated container having a hinged lid, a partitioned interior, a solar panel disposed upon said lid, a rechargeable battery pack wired in circuit with the solar panel, said battery pack thereby trickle chargeable when sunlight is incident said solar panel, and an air pump disposed in circuit with the battery pack, wherein water stored in the partitioned interior is aerated when the air pump is activated, whereby live, aquatic bait is storable for prolonged periods thereby.

1 Claim, 3 Drawing Sheets

SOLAR POWERED AERATED BAIT BOX

BACKGROUND OF THE INVENTION

Various types of bait boxes are known in the prior art. However, what is needed is a solar powered aerated bait box including an insulated container having a hinged lid, a partitioned interior, a solar panel disposed upon said lid, a rechargeable battery pack wired in circuit with the solar panel, said battery pack thereby trickle chargeable when sunlight is incident said solar panel, and an air pump disposed in circuit with the battery pack, wherein water stored in the partitioned interior is aerated when the air pump is activated, whereby live, aquatic bait is storable for prolonged periods thereby.

FIELD OF THE INVENTION

The present invention relates to a solar powered aerated bait box, and more particularly, to a solar powered aerated bait box including an insulated container having a hinged lid, a partitioned interior, a solar panel disposed upon said lid, a rechargeable battery pack wired in circuit with the solar panel, said battery pack thereby trickle chargeable when sunlight is incident said solar panel, and an air pump disposed in circuit with the battery pack, wherein water stored in the partitioned interior is aerated when the air pump is activated, whereby live, aquatic bait is storable for prolonged periods thereby.

SUMMARY OF THE INVENTION

The general purpose of the solar powered aerated bait box, described subsequently in greater detail, is to provide a solar powered aerated bait box which has many novel features that result in a solar powered aerated bait box which is not anticipated, rendered obvious, suggested, or even implied by prior art, either alone or in combination thereof.

The present invention has been devised to provide a suitable storage for the preservation of aquatic live bait during fishing and transport to and from a desired fishing site, and for other such activities wherein preservation of live bait is desirable.

The present invention includes an insulated container having a hinged lid enclosing a partitioned interior. A solar panel is disposed upon the hinged lid wired in circuit with a rechargeable battery pack. When sunlight is incident the solar panel, the battery pack is therefore trickle charged.

The battery pack is wired in circuit with an air pump disposed to draw air from the ambient environment and force said air into the partitioned interior. Water is storable in a first interior compartment, and an aerator is disposed in open communication with the air pump whereby air is consistently bubbled through water stored in the first interior compartment.

Dissolved oxygen levels are therefore maintained in water stored in the first interior compartment by means of the air pump, and live aquatic bait, therefore, stored in the first interior compartment, is preserved for use over prolonger periods traveling to or from a desired fishing site, or during fishing, as case may be.

A second interior compartment, disposed adjacent the first interior compartment, is usable for storage of ice (when desired) to maintain cool temperatures inside the partitioned interior. Moreover, additional items may be stored in the second interior compartment, such as other live bait (such as night crawlers, for example) or other accoutrements conveniently stored proximal the live bait while fishing.

Thus has been broadly outlined the more important features of the present solar powered aerated bait box so that the detailed description thereof that follows may be better understood and in order that the present contribution to the art may be better appreciated.

Objects of the present solar powered aerated bait box, along with various novel features that characterize the invention are particularly pointed out in the claims forming a part of this disclosure. For better understanding of the solar powered aerated bait box, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
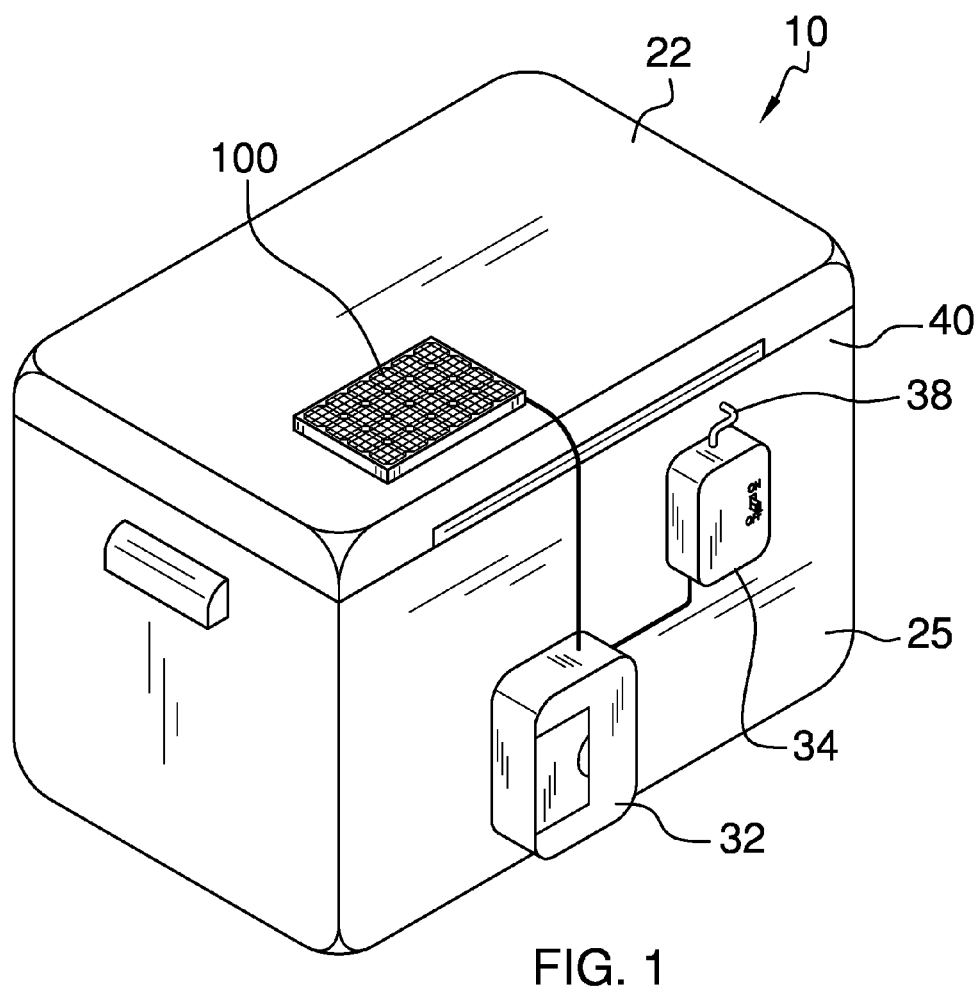
FIG. 1 is an isometric view.
Figure 2:
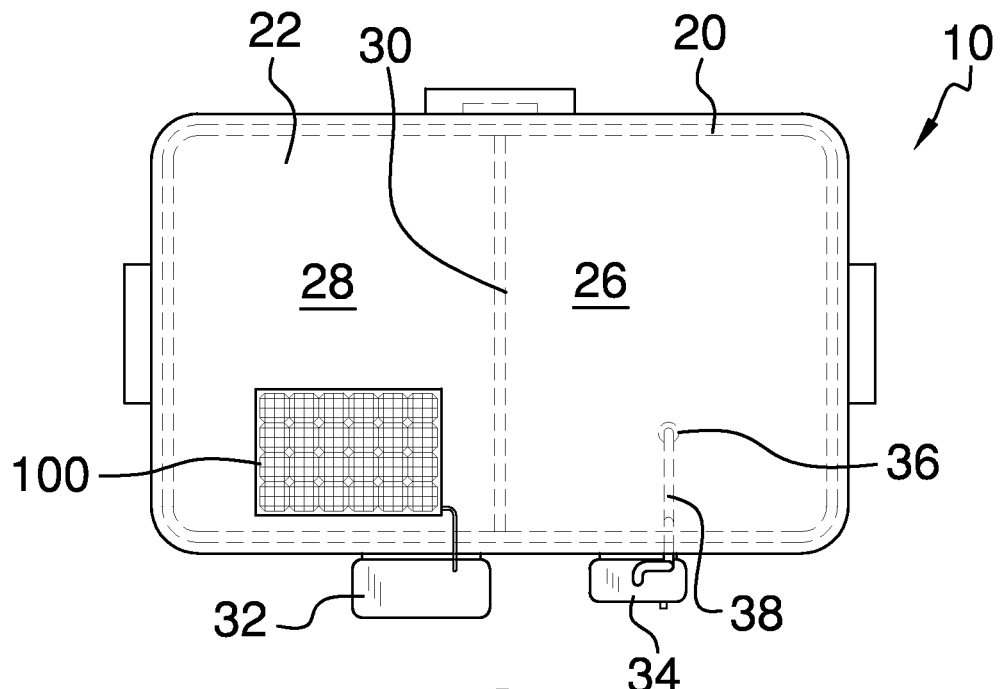
FIG. 2 is a top view.
Figure 3:
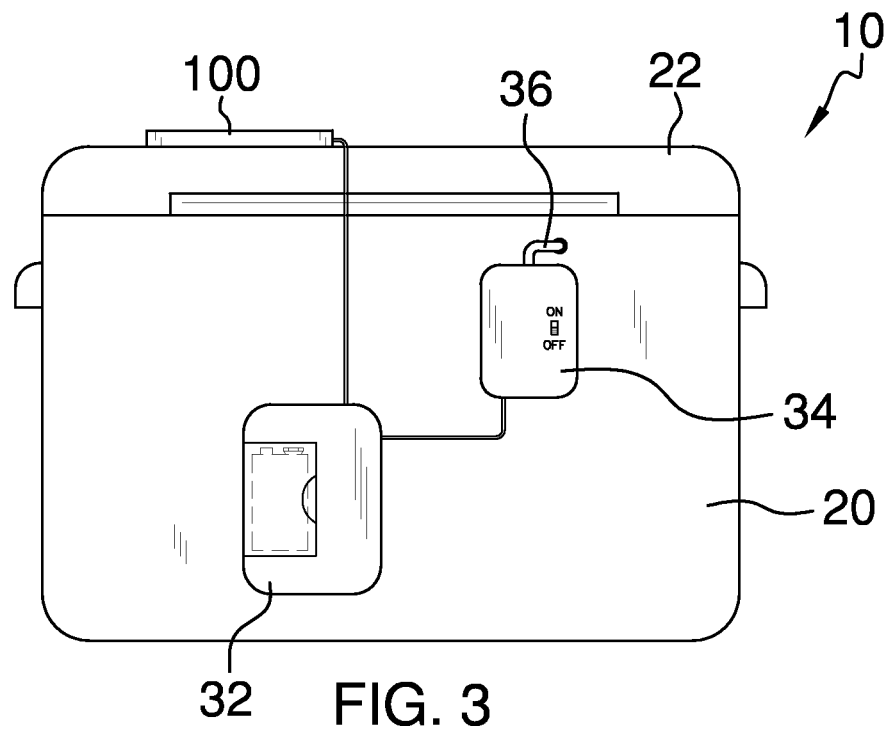
FIG. 3 is a rear view.
Figure 4:
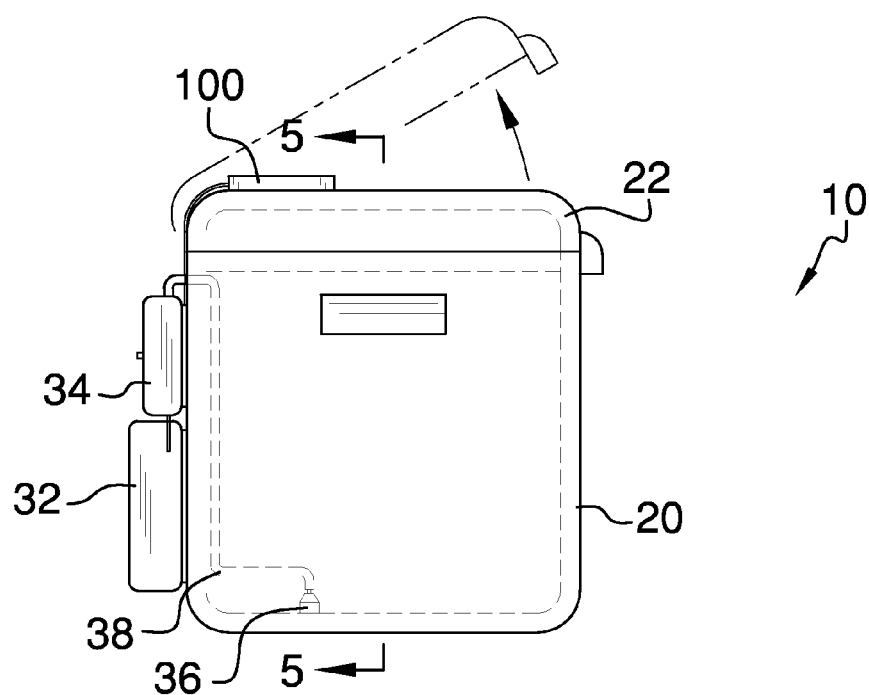
FIG. 4 is a side view.
Figure 5:
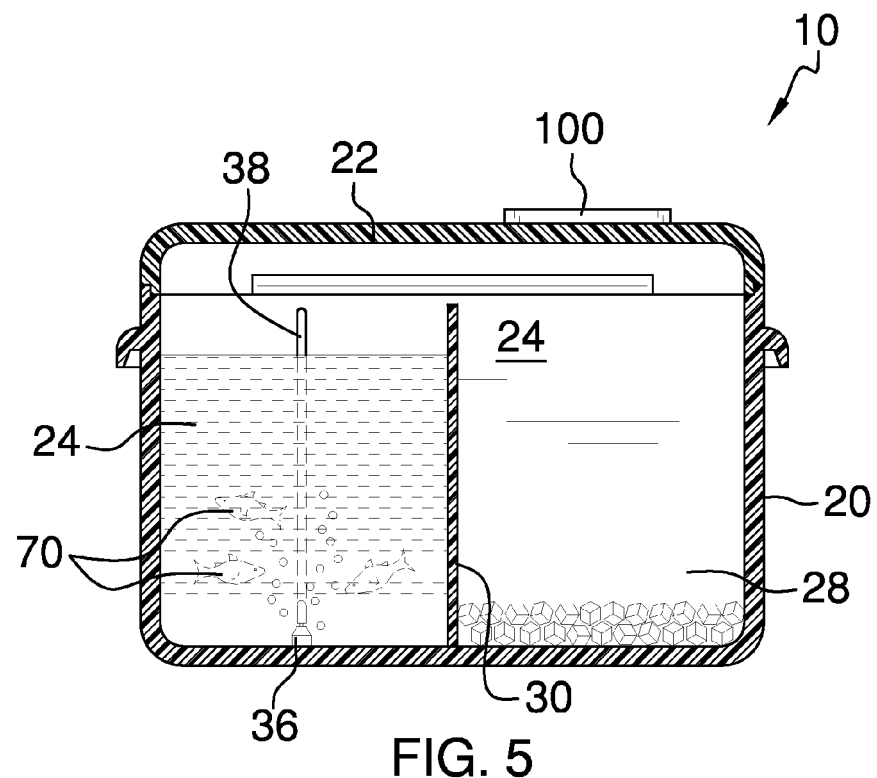
FIG. 5 is a cross-section view taken along the line 5-5 of FIG. 4.

With reference now to the drawings, and in particular FIGS. 1 through 5 thereof, example of the instant solar powered aerated bait box employing the principles and concepts of the present solar powered aerated bait box and generally designated by the reference number 10 will be described.

Referring to FIGS. 1 through 5 a preferred embodiment of the present solar powered aerated bait box 10 is illustrated.

The present invention 10 has been devised to enable prolonged storage of live aquatic bait 70 in a portable, aerated, aquatic environment while fishing, traveling to and from a fishing site, or for other purposes wherein such prolonged storage of live aquatic bait is desirable.

The present solar powered aerated bait box 10, therefore, includes an insulated container 20 having a hinged lid 22 enclosing a partitioned interior 24. A central partition 30 is disposed dividing the partitioned interior 24 into a first interior compartment 26 and a second interior compartment 28.

Water is therefore storable in the first interior compartment 26, as desired, and live aquatic bait 70 thereby storable within the first interior compartment 26. The second interior compartment 28 is contemplated for storage of ice (in hot climates where maintaining a cool interior is warranted) and other accoutrements useful to the craft of fishing.

To power the device 10, a solar panel 100 is disposed atop the lid 22 wired in circuit with a rechargeable battery pack 32. The battery pack 32 is thus trickle charged when sunlight is incident the solar panel 100. The battery pack 32 provides continual power required to run an air pump 34 to aerate the water stored within the first interior compartment 26 whereby dissolved oxygen levels are maintained within thresholds suited for preservation of live bait 70 stored therein.

The air pump 34 is disposed in circuit with the battery pack 32 and positioned to draw air from the ambient environment into the first interior compartment 26. The air pump 34 is mounted to an exterior surface 25 of the container 20 proximal the battery pack 32. Likewise, the battery pack 32 is mounted to the exterior surface of the container.

To bubble air drawn into the first interior compartment 26 when the air pump 34 is activated, an aerator 36, in open communication with the air pump 34, is disposed within the first interior compartment 26. Air forced into the first interior compartment 26 is drawn from the ambient environment and forced through an air tube 38 to be released as bubbles through the aerator 36. Bubbles produced in water stored in the first interior compartment 26 thus maintain dissolved oxygen levels therein, whereby live aquatic bait is preserved.

As shown in FIG. 1, an air pressure release valve 40 is contemplated to enable one-way venting of pressure from within the partitioned interior 24 to the external environment. Thus, as air is continually added into the partitioned interior 24, pressure is maintained below a threshold whereby a sealed closure of the hinged lid 22 atop the insulated container 20 is ensured.

Air thus continually bubbles through water stored in the first interior compartment 26 when the air pump 34 is activated and dissolved oxygen levels are maintained within thresholds suited for support of aquatic life stored therein. The partitioned interior 24 is sealed off from the ambient environment (with the exception of air drawn thereinto by means of the air pump) and is thermally insulated to maintain conditions well suited for prolonged preservation of live bait.

What is claimed is:

1. A solar powered aerated bait box comprising:

an insulated container having a hinged lid;

a solar panel disposed atop the lid;

a central partition dividing the insulated container into a first interior compartment and a second interior compartment;

a rechargeable battery pack mounted to an exterior surface of the container, wherein the battery pack is wired in circuit with the solar panel;

an air pump mounted to the exterior surface of the container proximal the battery pack, wherein the air pump is disposed in circuit with the battery pack, said air pump positioned to draw air from the ambient environment into the first interior compartment through an air tube;

an aerator, in open communication with the air pump, disposed within the first interior compartment; and a pressure release valve disposed to vent pressure from the partitioned interior;

wherein water is storable within the first interior compartment, said water aerated when the air pump is activated, whereby dissolved oxygen levels are maintained and live, aquatic bait may be stored and ported within the first interior compartment for prolonged periods.

\* \* \* \* \*